Oct. 13, 1964 D. D. LUCAS 3,152,536
PORTABLE BARBECUE
Filed Oct. 8, 1962 2 Sheets-Sheet 1
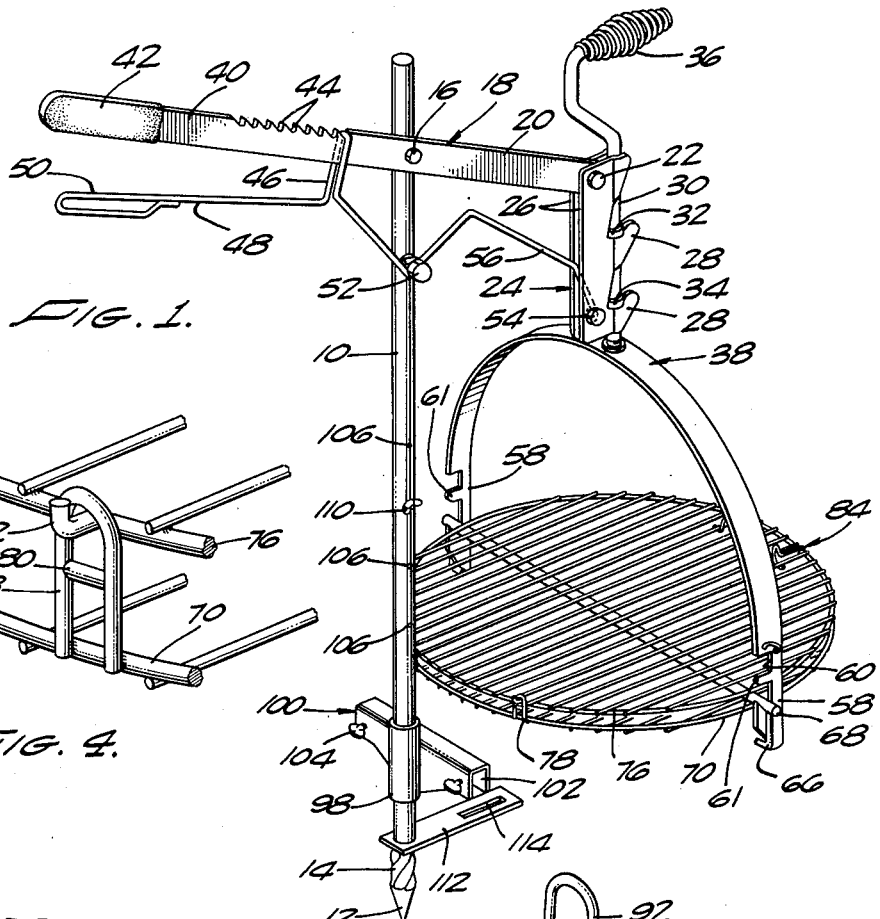
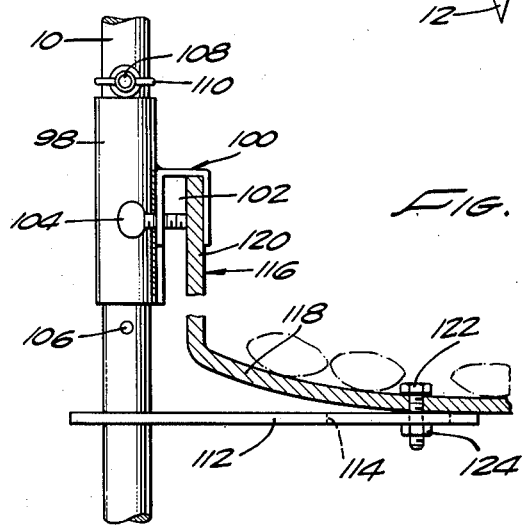
DON D. LUCAS
INVENTOR.
BY Hazard & Miller
ATTORNEYS

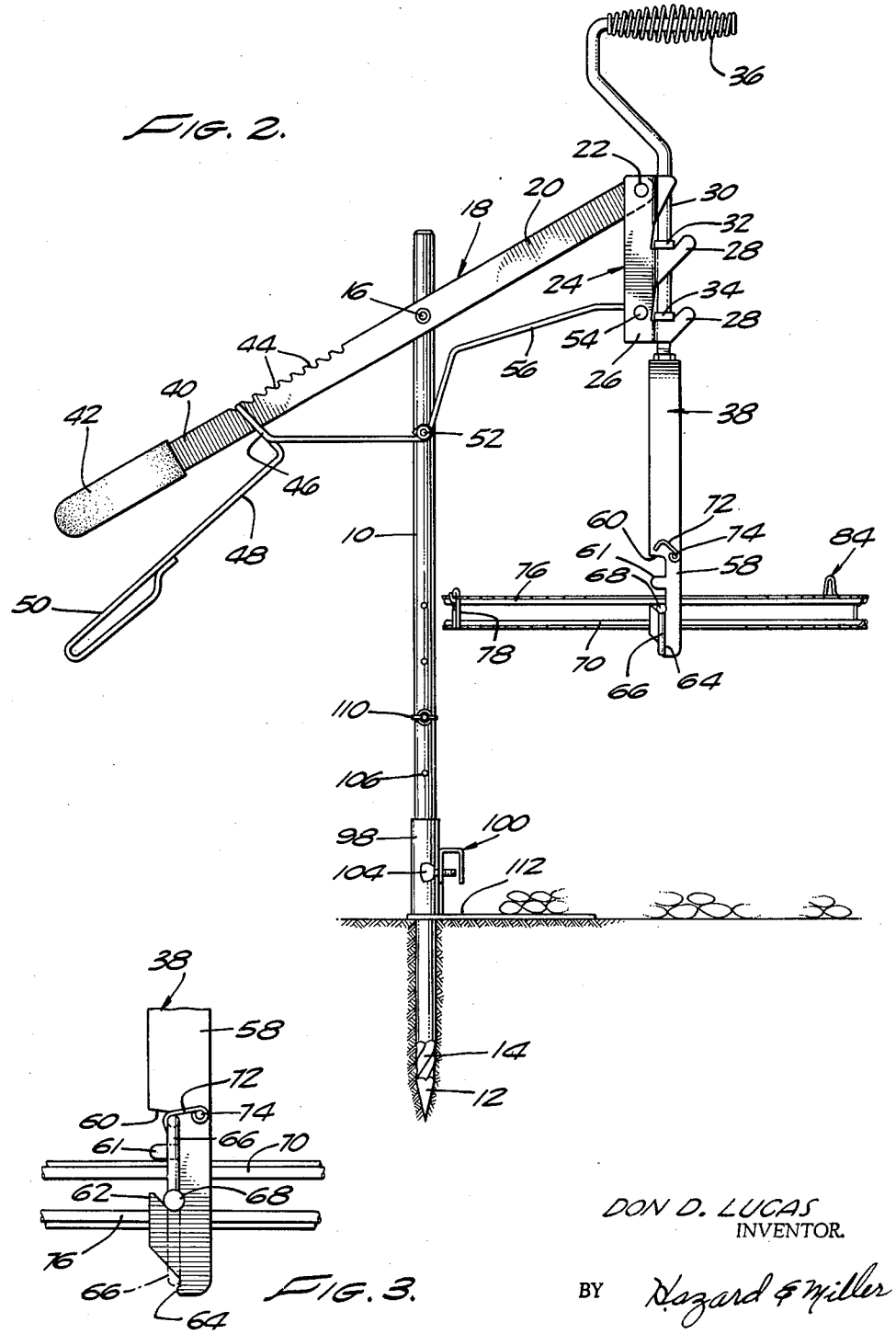

United States Patent Office 3,152,536
Patented Oct. 13, 1964

3,152,536
PORTABLE BARBECUE
Don D. Lucas, P.O. Box 665, Bakersfield, Calif.
Filed Oct. 8, 1962, Ser. No. 228,858
2 Claims. (Cl. 99—397)

This invention relates to a barbecue grill structure and more particularly to one of a portable type.

In general the grill structure includes an upright post having a sharpened lower end to facilitate its penetration of the ground and a grill support extending from the post in a lateral direction with a grill suspended from the support beside the post. The grill may be suspended over a fire laid directly on the ground or a fire pan may be provided with suitable supporting means therefor carried by the vertical post.

One of the objects of the invention is to provide a barbecue grill structure wherein the grill element per se is suspended in such manner that it can be turned from a first horizontal position to a second position approximately 180° from the first, and to provide the grill element with suitable food-retaining means thereon so that when the sides of the grill are reversed in position the food will be held properly.

Another object of the invention is to provide a reversible grill element with pivot means on an axis which is offcenter of the grill so that by its unbalanced weight it will tend to maintain the position to which it is turned so that very simple retaining means can be provided to hold it in the desired position of rotation about its horizontal pivotal axis.

Another object of the invention is to provide improved means for hinging and adjustably securing the food-retaining element relative to the grill element proper.

A further object of the invention is to provide a barbecue grill structure with the grill element reversible as stated above and wherein improved means is provided for suspending the grill element in various desired positions of vertical adjustment relative to a fire on the ground or in the fire pan.

Still another object of the invention is to provide a portable barbecue grill structure having in combination therewith a fire pan and wherein the vertical supporting post carries suitable means for adequately supporting and rigidly securing the fire pan to the vertical post.

The above and other objects of the invention will more fully appear from the following description in connection with the accompanying drawing.

FIG. 1 is a perspective view of the device with the fire pan not shown.

FIG. 2 is a side elevational view of the structure of FIG. 1 with the grill adjusted to its upper vertical position.

FIG. 3 is an enlarged fragmentary detail of the securing means for holding the grill in its two positions of rotation about its horizontal pivotal axis.

FIG. 4 is an enlarged fragmentary perspective of the adjustable hinge arrangement for the food-retaining means.

FIG. 5 is an enlarged fragmentary perspective of the adjustable catch device for the food-retaining means.

FIG. 6 is an enlarged fragmentary view of a portion of the post, the fire pan clamping and supporting means and a portion of the fire pan, the latter being shown in section.

In FIGS. 1 and 2 there is shown a vertical supporting post 10 having a pointed lower end 12 above which a small portion of the post is provided with a thread-like configuration 14 to facilitate penetration of the ground. At the upper portion of the post 10 is a pivot pin 16 which pivotally supports a lever 18. The lever has one end 20 extending laterally from the post and its extremity carries a pivot pin 22 which supports a grill suspension unit 24. The grill suspension unit includes a pair of plates 26 having vertically spaced lugs 28. Between the plates 26 is located a removable vertical rod 30 having collars 32 and 34 which are supported between respective pairs of the lugs 28. The upper end of the rod 30 is provided with a handle 36 and the lower end of the rod is connected to the upper medial portion of a bowed grill element support 38.

The opposite end 40 of the lever 18 is provided with a handle 42 and between the handle and the pivot 16 are notches 44 adapted to selectively receive an inverted U-shaped portion 46 which is part of a positioning device 48 for selective vertical adjustment of the grill element support 38. The positioning device 48 has a handle 50 at one end and is pivotally mounted at the other end on a pin 52 which is carried by the vertical post 10 a short distance below the lever pivot 16.

Between the pivot 52 and a pivot pin 54 on the lower end of the grill suspension unit 24 is a wire rod 56 which is arched upwardly as shown in FIGS. 1 and 2 to provide clearance for the bowed grill element support 38 when the grill element is elevated to the position of FIG. 2 and the support 38 is rotated by rotating the handle 36 and rod 30.

The lower ends of the grill element support 38 are identical in structure. One of them is shown at 58 in FIG. 3. It has a vertically elongated notch 60 which is bisected by a tongue 61 on the lower support end 58. The lower end of each notch 60 is defined by an upwardly disposed lug 62. Below the notch 60 the width of the grill support end portion 58 is reduced to provide an abutment shoulder 64. This shoulder as viewed in FIG. 3 is located to provide a stationary stop for a swingable stop element 66 which extends radially from a grill element pivot rod 68 which extends across and beyond opposite sides of an open work grill element 70. It will also be noted in FIG. 1 that the stop element 66 has an inwardly turned outer end which is the particular portion thereof which engages the abutment shoulder 64.

The rod 68 upon which the grill element pivots is offset slightly from the center of the grill so that the grill is biased to swing on its horizontal pivot 68 due to its unbalanced weight. Thus the grill element 70 can swing from a horizontal position with one side disposed upwardly to a second horizontal position with its opposite side disposed upwardly and the movable stop element 66 will move from the full-line position of FIG. 3 to the broken-line position thereof. As viewed in FIG. 3 in the full-line position of the grill element 70 is unbalanced to the right of the pivot 68 and in the broken-line position of the stop element 66 the grill element will be disposed in the positions of FIGS. 1 and 2 and positioned with its unbalanced greater weight to the left of the pivot 68.

When the grill element is in the position of FIG. 3 it is held against swinging on its pivot 68 by a catch 72 pivoted on a pin 74 on the end 58 of the bowed support 38.

It will be noted that the notch 60 is bisected by a tongue 61 which forms a part of the lower end portion 58 of the side of the support 38, and that the length of each of the stop elements 66 is greater than the distance from the bottom of the notch 60 to said tongue 61. Therefore, when the grill and its stop elements 66 and swung so that the stop elements are in their uppermost postions, as viewed in FIG. 3, the tongues 61 will hold the grill against accidental displacement which might occur should the grill support arms 58 be swung apart a distance greater than the length of the pivot rod 68.

A food-retaining element 76, preferably of the same structure as the grill element 70, is provided to retain pieces of food to be cooked on the grill element regardless of the rotational position in which the grill element is placed. The grill elements 70 at one edge portion thereof is provided with an upstanding inverted U-shaped member 78 having a cross member 80 thereon. The rim of the food retainer 76 is provided with a hook 82 which is selectively receivable either beneath the upper end of the U-shaped member 78 or beneath the cross member 80 to hold the food retainer in either of two spaced positions relative to the grill element. The members 78 and 82 are duplicated and spaced a short distance from each other as indicated in FIG. 1.

At opposite sides of the grill element and food retainer from the adjustably spaced hinges made up of the U-shaped element 78 and hook 82 are adjustable clamping hooks one of which is shown at 84 in FIG. 5. These hooks are preferably made of stiff wire and bent loosely at 86 about the rim of the food retainer 76. Extending downwardly from the convolutions 86 the wire terminates in a lower hook 88. An upper hook 90 is secured to the wire in vertical alignment with the hook 88. Extending in the other direction from the intermediate convolutions 86 the wire is bent upwardly in an inverted U shape as at 92 and the end of the wire adjacent the U is bent horizontally as at 94 so that it may be hooked beneath one of the straight cross wires 96 which makes up a major portion of the food retainer 76. Thus not only can the hinge comprising the retainers 78 and hooks 82 provide adjustable space from the food-retaining element but the hooks 88 and 90 provide like adjustment at the opposite side of the grill. An article of food can be placed upon the grill and the retainer swung down over it and one of the hooks 88 or 90 engaged with the rim of the grill 70 to hold the food in position depending upon the thickness of the particular article of food being cooked.

Vertically slidable upon the upright post 10 is a sleeve 98 to which is welded or otherwise suitably secured a horizontally disposed bracket 100 having a downwardly open mouth 102. Suitable thumb screws 104 are threaded through one leg of the bracket 100 toward the inner face of the other leg of the bracket. The post 10 is provided with vertically spaced apertures 106 to selectively receive a bolt 108 having a thumb nut 110 to limit upward sliding movement of the bracket sleeve 98 on the post 10.

Vertically slidable and also rotatable on the post 10 beneath the bracket sleeve 98 is a brace 112 which extends laterally from the post and is provided with an elongated slot 114 which extends lengthwise of the brace 112.

In FIG. 6 there is shown a portion of a fire pan 116 which has a bottom 118 and an upstanding side wall 120. Extending through and below the pan bottom 118 is a bolt 122 which is receivable through the slot 114 in the brace 112 and a nut 124 on the bolt 122 is provided to clamp the brace and the fire pan together. When the upstanding edge of the fire pan is located in the bracket 100 and the thumb screws 104 of said bracket are tightened together with the nut 124, the fire pan will be connected rigidly with the vertical post 10. The side wall 120 of the fire pan is shown broken since it is intended that said side wall be fairly high and the bottom 118 of the fire pan will rest upon the ground. Thus the vertical post 10 and the grill unit which it supports may all be supported by the fire pan or the post can be pushed into the ground and also connected with the fire pan to provide dual support for the post.

From the foregoing it will be seen that I have provided a barbecue grill structure which can be readily set up in any convenient location on open ground. It is a structure wherein the grill element can be reversed on its horizontal pivotal support so that opposite sides of a steak or other article of food can be disposed toward the fire and the food held in proper position by the food-retaining means which is adjustable toward and away from the grill element. The grill element and food-retaining means together with the supporting bow 38 for the grill element can be rotated with the vertical rod 30 through more than a 360° rotation. Furthermore, means is provided for firmly and conveniently connecting the vertical post 10 to a fire pan which may be in the form of a steel drum or the like.

It should, of course, be understood that various changes can be made in the form, detail, arrangement and proportions of the various parts without departing from the spirit of the invention.

I claim:

1. In a barbecue grill structure, a grill element, a bowed grill element support of inverted U-shape with free lower ends, said grill element having a horizontal pivot rod secured thereto and extending laterally from opposite sides thereof, the lower ends of said support having cutaway portions to removably receive the extending ends of said pivot rod to support said grill element, stop elements on and extending radially from said pivot rod and lying outside of the free lower ends of said grill element support to prevent said free lower ends from springing apart and dropping said grill element, and the ends of said stop elements having portions directed inwardly to alternately engage spaced points on said ends of said support to limit pivotal movement of said grill element.

2. In a barbecue grill structure, a support, an open work grill element having pivot means at opposite edge portions thereof, said pivot means having axially offset portions adjacent each end thereof and adjacent said opposite side edge portions of the grill element, said support having horizontally spaced portions for pivotally supporting said pivot means, said horizontally spaced support portions each having a pair of notches disposed one above the other with a part of the support separating the notches, said pivot means being disposed in one of said notches, the offset portion of said pivot means extending vertically to the other notch in one pivotal position of the pivot means and grill element, and in such position, a part of said offset portion extending into said other notch, and means on said support releasably securing that part of said offset portion extending into said other notch.

References Cited in the file of this patent

UNITED STATES PATENTS

| | | |
|---|---|---|
| 263,339 | Humphrey | Aug. 29, 1882 |
| 547,593 | Wagoner | Oct. 8, 1895 |
| 2,448,456 | Niskanen et al. | Aug. 31, 1948 |
| 2,826,981 | Chick | Mar. 18, 1958 |
| 2,844,139 | Lucas | July 22, 1958 |
| 2,868,111 | Laskowski | Jan. 13, 1959 |
| 2,912,973 | Lucas | Nov. 17, 1959 |
| 3,051,075 | Watts | Aug. 28, 1962 |
| 3,056,344 | Miller | Oct. 2, 1962 |